July 31, 1956 M. J. GALLA 2,757,018
HINGED FENDER SKIRT
Filed Oct. 24, 1951 3 Sheets-Sheet 2
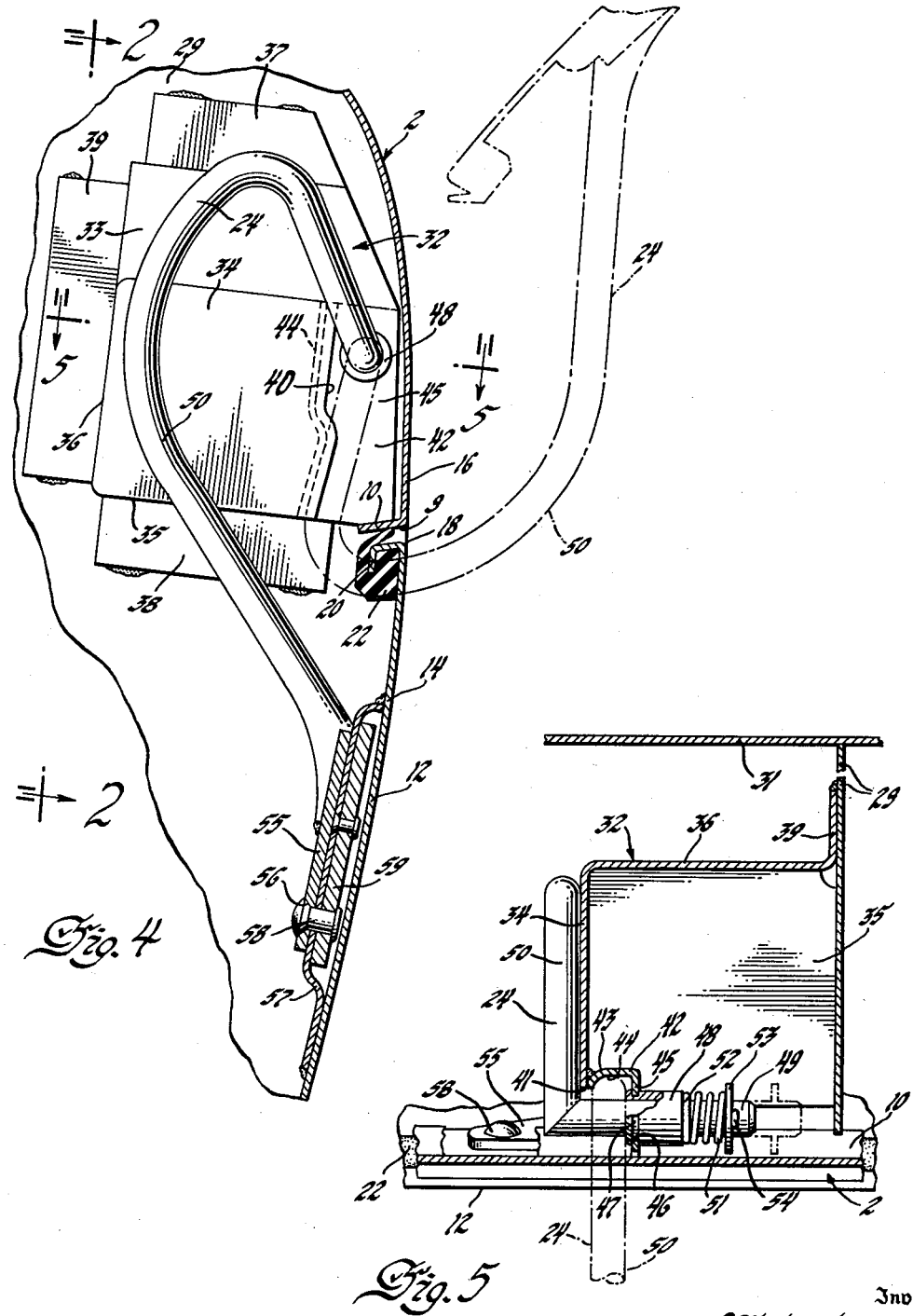
Inventor
Michael J. Galla
By
Willits, Helwig & Baillie
Attorneys

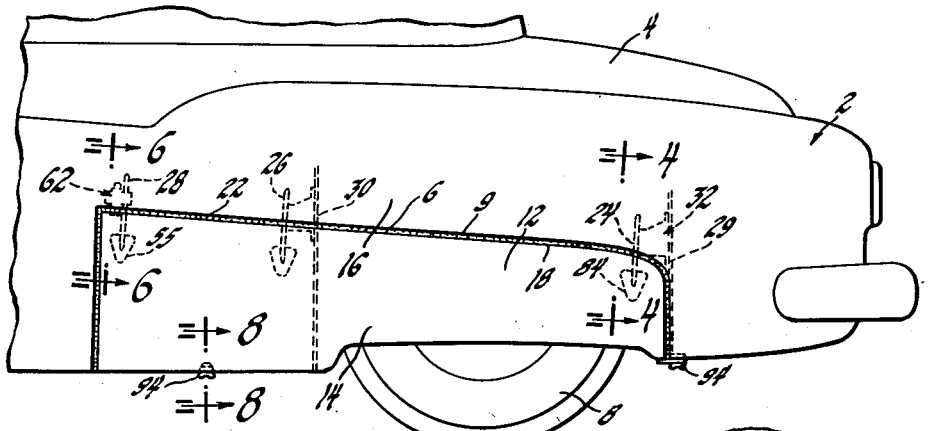

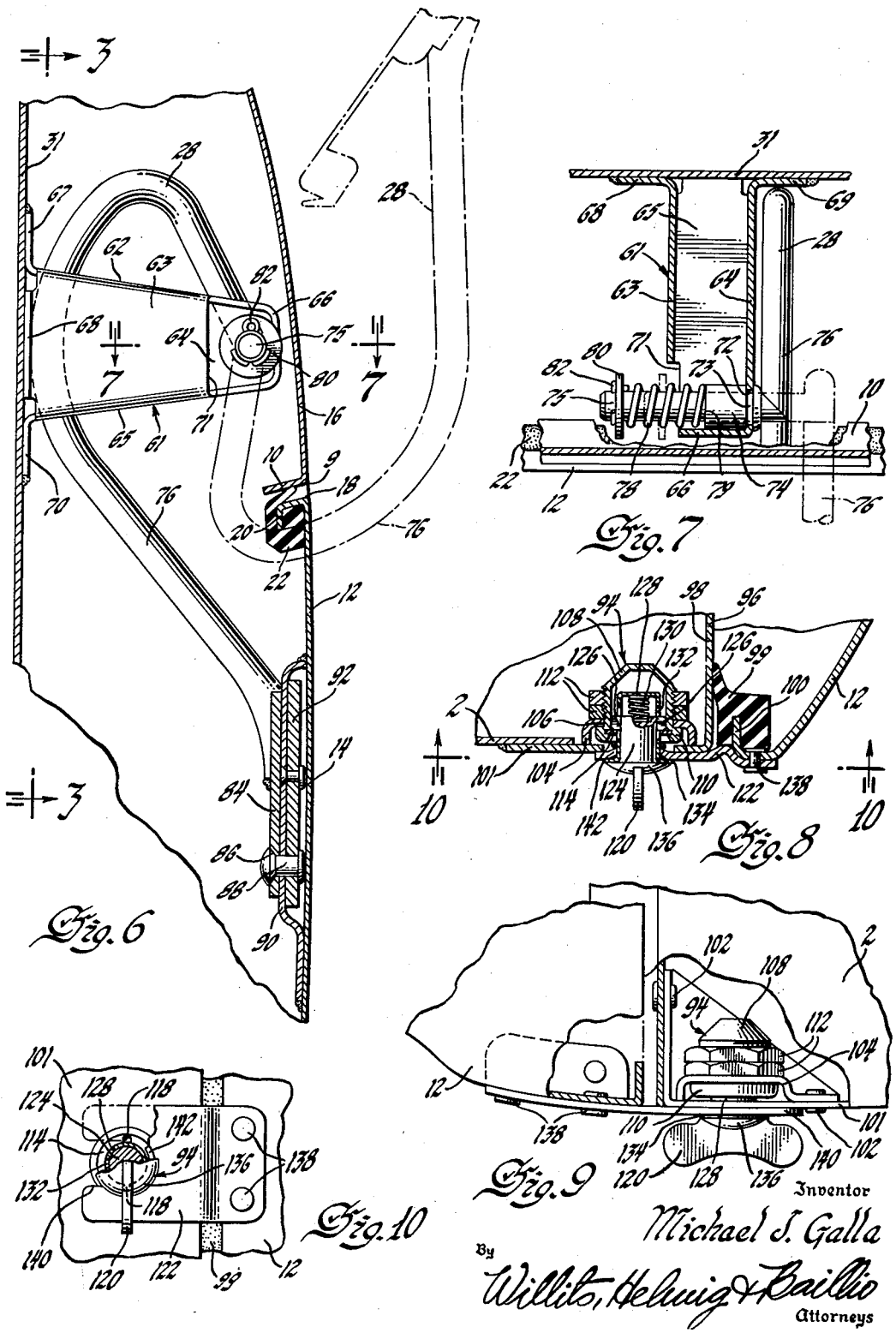

United States Patent Office 2,757,018
Patented July 31, 1956

2,757,018

HINGED FENDER SKIRT

Michael J. Galla, Royal Oak, Mich., assignor to General Motors Corporation, Detroit, Mich., a corporation of Delaware Application October 24, 1951, Serial No. 252,823

7 Claims. (Cl. 280—153)

This invention relates to fender and fender skirt constructions, and more particularly to means for mounting the skirt on the fender and to locking means for said skirt.

It is well known in the art to provide a recess or notch in the rear fenders of an automotive vehicle to facilitate removal of the rear wheels. It is also well known to provide pivotally mounted closures or skirts to close the fender notches for the purpose of improving the appearance of the fender structure as a whole during periods when access to the rear wheel is unnecessary.

The prior types of hinged skirts reduce the amount of physical handling required insofar as adjustment thereof to open and closed position is concerned, but the mechanisms associated therewith for securing the skirts in open position have required some special manual operation after the said skirts had been swung to open position. During operation of a vehicle, mud and dust accumulate on the inner surface of the fenders and skirts and accordingly the handling thereof to change tires becomes highly undesirable unless it can be done without coming in contact therewith.

One object of the present invention is to provide a hinged fender skirt, which may be operated to and fastened in its different positions of adjustment without necessitating contact with the inner surface thereof.

Another object is to provide retaining means for a hinged fender skirt which operates automatically to hold it in raised position.

Still another object is to provide retaining means for holding a fender skirt in raised position which is releasable by bodily endwise movement of said fender skirt.

A further object is to provide an improved fender skirt hinge which is so constructed as to prevent rattling under the most severe operating conditions.

A still further object is to provide a hinged fender skirt which is simple in construction, economic in manufacture and easy to operate.

Other and further objects of the invention will become apparent as the description thereof progresses.

Of the drawings:

Fig. 1 is a side elevational view of a rear fender showing a fender skirt mounted thereon;

Fig. 2 is a fragmentary elevational view of a portion of the inner structure of the rear surface of the fender and skirt showing the structure of the rear hinge thereof;

Fig. 3 is a similar elevational view showing the structure of the front hinge of the fender skirt;

Fig. 4 is a fragmentary transverse view partly in section, taken substantially along 4—4 of Fig. 1, showing the relative position of the pivot arm of the rear hinge of the fender skirt in both open and closed positions;

Fig. 5 is a plan view partly in section, taken substantially along line 5—5 of Fig. 4;

Fig. 6 is a fragmentary transverse view, partly in section, taken substantially along line 6—6 of Fig. 1, showing the front pivot arm in both open and closed position;

Fig. 7 is a plan view, partly in section, taken substantially along the line 7—7 in Fig. 6;

Fig. 8 is a fragmentary, transverse sectional view, taken substantially along line 8—8 of Fig. 1 showing a fender locking means;

Fig. 9 is an enlarged fragmentary side view, partly in section, of the rear fender lock, certain parts being broken away to more clearly show the structure of certain features thereof; and, Fig. 10 is a fragmentary plan view, partly in section, showing the structure of certain features of the fender lock taken along line 10—10 of Fig. 8.

Referring now to the drawings, there is illustrated an automobile fender 2 which is attached in the usual manner to the body of a vehicle 4. Each fender 2 is provided with an enlarged notch or open recess 6 adjacent to a road wheel 8. The edge 9 of the fender around notch 6 is provided with an in-turned flange 10. The notch 6 is adapted to be closed by a fender skirt 12 which is so shaped as to conform with the area of notch 6 and is pivotally attached to the fender 2 in a manner to be fully set forth later herein. The skirt 12 when in closed position neatly occupies the entire area of notch 6 and the outer surface 14 thereof is substantially flush with the outer surface 16 of the fender 2. The perimeter 18 of the fender skirt 12 is formed with a flange 20 of substantially U-shaped cross-section. Flange 20 has secured thereto a rubber strip 22 which is adapted to seal the marginal gap between said flange and the flange 10 of fender 2. The skirt 12 is mounted on fender 2 by a series of hinges 24, 26 and 28 disposed substantially in axial alignment along the inside of fender 2 above flange 10, as shown in Fig. 1. Since hinges 24 and 26 are identical in construction, a detailed description of one will suffice for both.

As shown in Figs. 1, 2 and 5 transverse, vertically disposed wall panel members 29 and 30 extend between fender 2 and longitudinally extending body panel 31 and are secured thereto in any suitable manner as by welding. Secured to wall 29 in any suitable manner, as by welding, is a hinge bracket 32 of box-like construction having a top wall 33, a side wall 34, a bottom wall 35 and a rear wall 36. Substantially vertical flanges 37, 38 and 39 extending from walls 33, 35 and 36, respectively, lie against the transverse panel 29, as shown in Figs. 2 and 4, and are secured thereto by welding. The substantially vertical outer edge 41 of side wall 34 has secured adjacent thereto by welding, a vertically disposed angle member 42. One leg 43 of angle member 42 is depressed as shown at 44, to receive hinge 24 as will appear more fully later herein. The other leg 45 of angle member 42 is provided with an opening 46 for receiving the reduced end 47 of a bushing 48 slidably mounted on hinge or pivot pin 49. When the parts are assembled, as shown in Fig. 5, the reduced end 47 of bushing 48 is swaged or rolled over into engagement with the side of leg 45 as shown at 47, thereby securing the said bushing to angle member 42.

The forward end of pivot pin 49 is secured to a gooseneck hinge arm 50 disposed substantially at a right angle to said pin. A spring 51 extends between the rearwardly disposed end 52 of bushing 48 and a washer 53 held on pin 49 by a cotter key 54. Spring 51 urges goose-neck arm 50 into abutting relation with said wall 34 of bracket 32, and when said arm has been swung to the position shown in broken lines in Fig. 4, said spring urges pin 49 and arm 50 rearwardly until said arm engages the leg 45 of angle member 42. After the spring 51 has moved skirt 12 axially as just described, the said skirt will move downwardly when released by the operator thereby causing the arm 50 of hinge 24 to seat in the depression 44 in angle member 42. The skirt will now remain in open position. To lower skirt 12 to close the recess or notch 6 the operator simply raises it slightly until arm 50 clears depression 44, and then moves it forwardly against the action of spring 51 and then permits it to swing downwardly to closed position. The lower extremity of the goose-neck member 50 is attached to a foot 55 by welding or other suitable means. The foot 55 is formed with spaced openings 56 which align with openings provided in a pad 57 secured to the inner side of skirt 12 by welding. Rivets 58 extend through openings in foot 55 and pad 57 and also through aligned openings provided in a reinforcing plate 59 to secure hinge arm 50 to fender skirt 12. The hinge structure 26 and the means for securing it to the fender skirt 12 is the same as that just described for hinge 24 and accordingly the description thereof need not be repeated.

Referring now to Figs. 3, 6 and 7, the supporting bracket 61 for hinge 28 is secured to the longitudinal body panel 31. Bracket 61 is of box-like construction and comprises a top wall 62, side walls 63 and 64, a bottom wall 65 and a front wall 66. Walls 62, 63, 64 and 65 terminate in vertical flanges 67, 68, 69 and 70, respectively, which are secured to body panel 31 in any suitable manner as by welding. The outer portion of said wall 63 is cut away, as shown at 71. Wall 64 has an opening 72 provided therein opposite the cut away portion 71 through which extends the reduced end 73 of a bushing 74. After insertion of the reduced end 73 through opening 72 the end thereof is swaged or rolled against wall 64 thereby effectively retaining the said bushing in position. Hinge 28 is constructed similarly to hinges 24 and 26 and comprises a pivot pintle portion 75 which extends through and is journaled for rotary and reciprocatory movement in bushing 74 and a goose-neck arm portion 76 which is secured to fender skirt 12. A spring 78 surrounds the pintle portion 75 of hinge 28 and is lightly compressed between the front face 79 of bushing 74 and a washer 80, which is retained on pintle 75 near the forward end thereof by a cotter key 82. The spring 78 yieldingly urges the hinge 28 axially forwardly tending to draw the goose-neck arm 76 into abutting relation with the rear surface 64 of bracket 61. The lower extremity of arm 76 is attached as by welding to a foot 84 having rivet holes 86 provided therein. Rivets 88 secure the foot 84 to a pad 90 welded to skirt 12 and to a reinforcing plate 92 disposed between said pad and fender skirt, as shown in Fig. 6.

Mechanism is also provided for securing the fender skirt 12 in closed position. As shown in Figs. 1 and 8 to 10, a pair of widely spaced fastening means 94 is provided. Inasmuch as each fastening means 94 is similar in construction a detail description of one will suffice for both. As shown in Fig. 8 an L-shaped supporting bracket 96 is welded or otherwise secured to the lower edge of fender 2. The vertical leg 98 of bracket 96 forms a stop for the fender skirt 12 when the latter has been swung to closed position. When in this position, a resilient strip 99 secured on a flange 100 provided at the lower edge of skirt 12 engages the outer surface of leg 98. Secured in any suitable manner, such as by rivets 102, to the substantially horizontal leg 101 of bracket 96 is a second substantially U-shaped bracket 104. Bracket 104 has an opening 106 provided centrally thereof through which an externally threaded thimble-like member 108 extends. In assembly, member 108 is inserted upwardly through opening 106 until the annular shoulder 10 thereof engages the under surface of bracket 104. Lock nuts 112 engaging the external threads on member 108 rigidly secure the latter in position. An annular ring 114 having diametrically opposed slots 118 therein is secured in an annular recess near the lower end of member 108. A wing type locking bolt 120 adapted to engage a bifurcated extension plate 122 secures the skirt in closed position. Bolt 120 comprises a cylindrical intermediate portion 124 having a pair of diametrically opposed laterally extending lugs 126 at the upper end thereof which are adapted to be inserted through slots 118 in annular ring 114. After insertion of the lugs through slots 118, by turning bolt 120 on its axis the said lugs engage the ring 114 and thereby secure the bolt and fender skirt in position.

In order to resiliently hold the parts in position and to permit ready release of bolt 120 a casing 128 having a spring 130 therein is slidably mounted on the cylindrical portion 124 of bolt 120. Casing 128 has a pair of diametrically opposed elongated slots 132 provided therein for receiving and guiding the lugs 126 on bolt 120. The outer end of casing 128 has a flange 134 provided thereon which engages the head 136 of bolt 120 when the latter has been inserted upwardly into locking position, as shown in Fig. 8. Spring 130 extends between the upper end of bolt 120 and the top of casing 128 and thereby resiliently retains the parts in position. Extension plate 122 may be secured to the lower edge of fender skirt 12 by rivets 138 and the bifurcations 140 thereof are adapted to straddle the cylindrical portion of bolt 120, as shown more particularly in Fig. 10 when skirt 12 is in closed position. The portion 142 of plate 122 adjacent bolt 120 is slightly raised and curved to conform with shape of the abutting parts.

From the foregoing description it is seen that to release the fender skirt 12 it is only necessary to turn wing bolts 120 until the lugs 126 thereon register with the slots 118 in ring 114 whereupon springs 130 urge said bolts downward out of engagement with plates 122. The fender skirt 12 may now be swung upwardly as previously described. When the gooseneck arms 50 of hinges 24 and 26 clear the front edges of their associated supporting brackets 32, the springs 51 and 78 urge the hinges and fender skirt rearwardly. Upon release of the fender skirt 12 it will swing downwardly slightly causing the arms 50 of hinges 24 and 26 to engage the depressed portions 44 of angle members 42 thereby retaining the said fender skirt in raised or open position. To lower the fender skirt 12 to closed position, it is first swung upwardly slightly until arms 50 clear the front edges of members 42, and then bodily moved forwardly against the action of spring 51 and 78 until the hinge arms 50 clear the side walls 34 of supporting brackets 32. The skirt is then swung downwardly to closed position. When fender skirt 12 reaches the position shown in full lines in the drawings the bolts 120 are inserted between the bifurcations 140 of plates 122. The lugs 126 on bolts 120 are passed through the slots 118 in ring 114 and the said bolts are then turned bringing the said lugs into locking engagement with said ring, as previously described. During insertion of the bolts 120 in this manner, the spring 130 disposed within casings 128 are compressed as the lugs 126 move upwardly in the guide slots 132 of said casing and consequently when the said bolts are turned into locking engagement with ring 114, the said spring resiliently holds the parts in position.

While but a single embodiment is shown and described herein, it is apparent that certain changes and modifications may be made therein without departing from the invention. It is therefore to be understood that it is not intended to limit the invention to single embodiment shown but only by the scope of the claims which follow.

I claim:

1. In combination, a fender having a wheel access notch provided therein, a fender skirt formed to occupy said notch, one or more supporting members, one or more hinge elements pivotally connecting said skirt to said supporting members, each of said hinges having a journal portion mounted for rotary and axial movement on one of said supporting members and an arm portion secured to said skirt, and means for urging said hinges and skirt axially when the latter is in open position, whereby said arm portion engages said supporting member to retain said skirt in open position.

2. In combination, a vehicle fender having a wheel access notch provided therein, a fender skirt formed to occupy said notch, a plurality of spaced supporting members, a plurality of spaced hinge elements, one for each of said supporting members, for pivotally connecting said skirt thereto, each of said hinges comprising a pivot portion mounted for rotary and axial movement on its associated supporting member and an arm portion secured to said skirt, and one or more of said supporting members having a retaining notch provided therein for receiving said arm portion when said skirt has been swung to open position to thereby retain the latter in said position.

3. The invention set forth in claim 2, including resilient means for moving said hinge elements and skirt axially when the latter has been swung to open position.

4. The invention set forth in claim 3 including fastening means for retaining said skirt in closed position.

5. In combination, a vehicle fender having a wheel access notch provided therein, a fender skirt formed to occupy said notch, one or more supporting members, each having a side wall and a front portion, one or more hinge elements pivotally connecting said skirt to said supporting members, whereby said skirt may be swung to open and closed positions, each of said hinge elements comprising a journal portion adapted for rotary and axial movement on the associate of said supporting members, and a curved arm secured to said skirt, said arms engaging the said side walls of said supporting members during movement of said skirt between open and closed positions thereby holding said skirt against axial movement, means for actuating said hinge elements and skirt axially when the latter is in open position, and at least one of said arms engaging the said front portion of the associate of said supporting members upon axial movement of said skirt when in open position to retain the latter in said position.

6. In combination, a vehicle fender having a notched wheel opening, a fender skirt formed to occupy said opening, a plurality of axially aligned hinges pivotally connecting the upper portion of said skirt to the upper margin of said notched opening, said hinges comprising pivotal members attached to said skirt and journaled in fixed support members on said fender, one or more of said fixed members being formed with a frontal surface having an indented notch, each of said pivotal members having a goose-neck arm disposed at substantially right angles thereto, said goose-neck being formed to abut said frontal surface of said fixed member when said skirt is in the closed position and to sweep clear of said frontal surface and axially shift into said indented notch of said frontal surface in response to said spring urging when said skirt is rotated to its open position, and fasteners adapted to connect locking plates formed on said skirt and said fender when said skirt is in the closed position.

7. In combination, a vehicle fender having a notched wheel opening, a fender skirt formed to occupy said opening, a plurality of axially aligned fixed support members attached to said fender, a plurality of pivotal members attached to said skirt, said fixed members having axially aligned bearings, one or more of said fixed members being formed with a frontal surface having a depression provided therein, said pivotal members comprising a goose-neck arm extending at substantially right angles to one end of an axially spring urged pivot shaft journalled in said fixed member, said arm engaging one side of said support to prevent axial movement between open and closed position and said arm engaging another portion of the support to retain the closure means in open position.

References Cited in the file of this patent

UNITED STATES PATENTS

| 615,690 | Eschweiler | Dec. 13, 1898 |
| 700,694 | Le Marr | May 20, 1902 |
| 1,947,525 | Hume | Feb. 20, 1934 |
| 2,038,977 | Zimmerman | Apr. 28, 1936 |
| 2,143,736 | Lefevre | Jan. 20, 1939 |
| 2,157,793 | Lang | May 9, 1939 |
| 2,196,030 | Schatzman | Apr. 2, 1940 |
| 2,500,207 | Schatzman | Mar. 14, 1950 |
| 2,605,119 | Earnest | July 29, 1952 |
| 2,634,138 | Zabel | Apr. 7, 1953 |

FOREIGN PATENTS

| 101,682 | Sweden | May 27, 1941 |